H. HASTINGS.
TURNING MACHINE.
APPLICATION FILED JULY 3, 1913.
1,303,199.
Patented May 6, 1919.
7 SHEETS—SHEET 1.
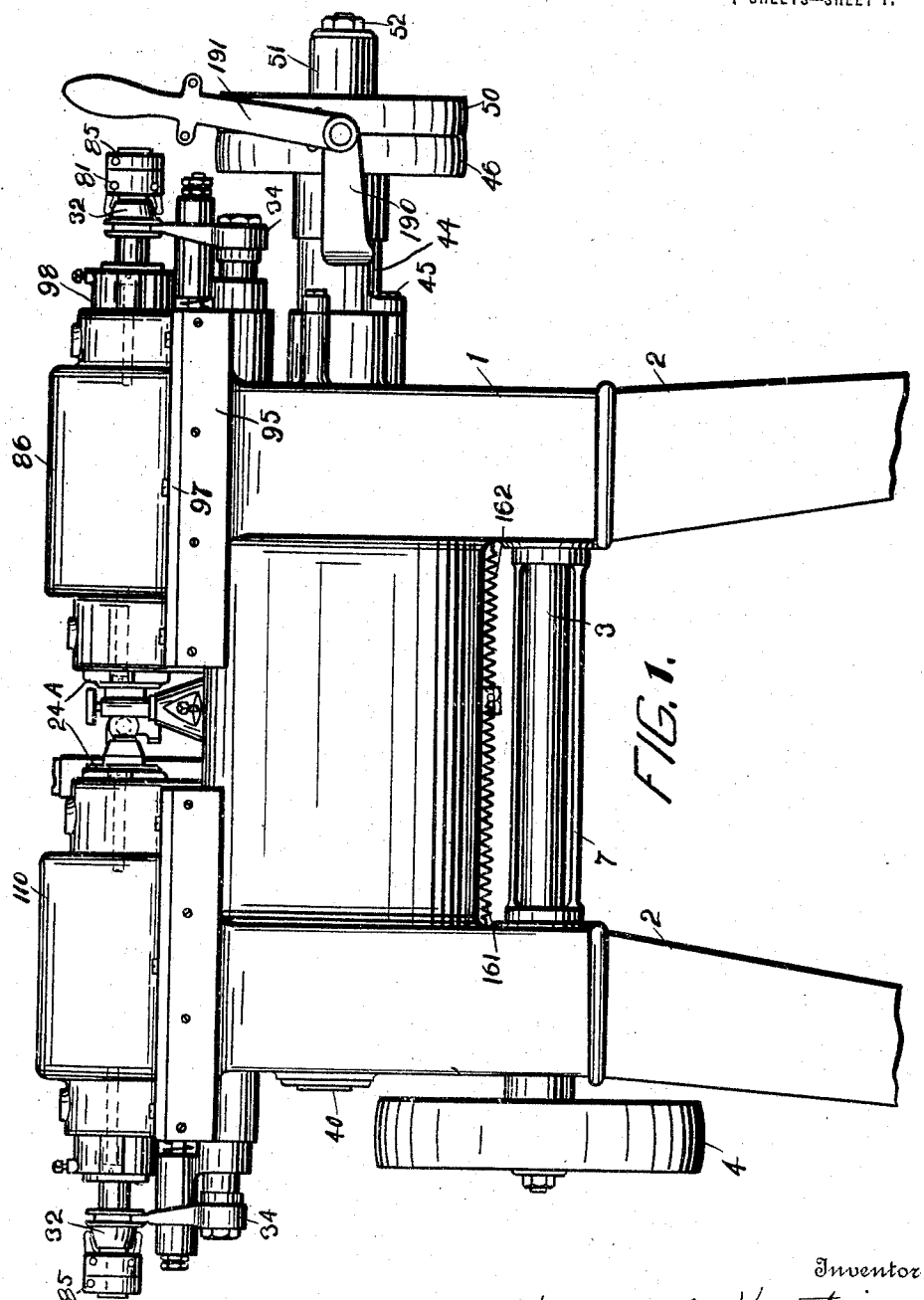
Witnesses
Eric Eschinger
Alice M. Johanns
Inventor
Herbert Hastings
By Frank Keifer
Attorney

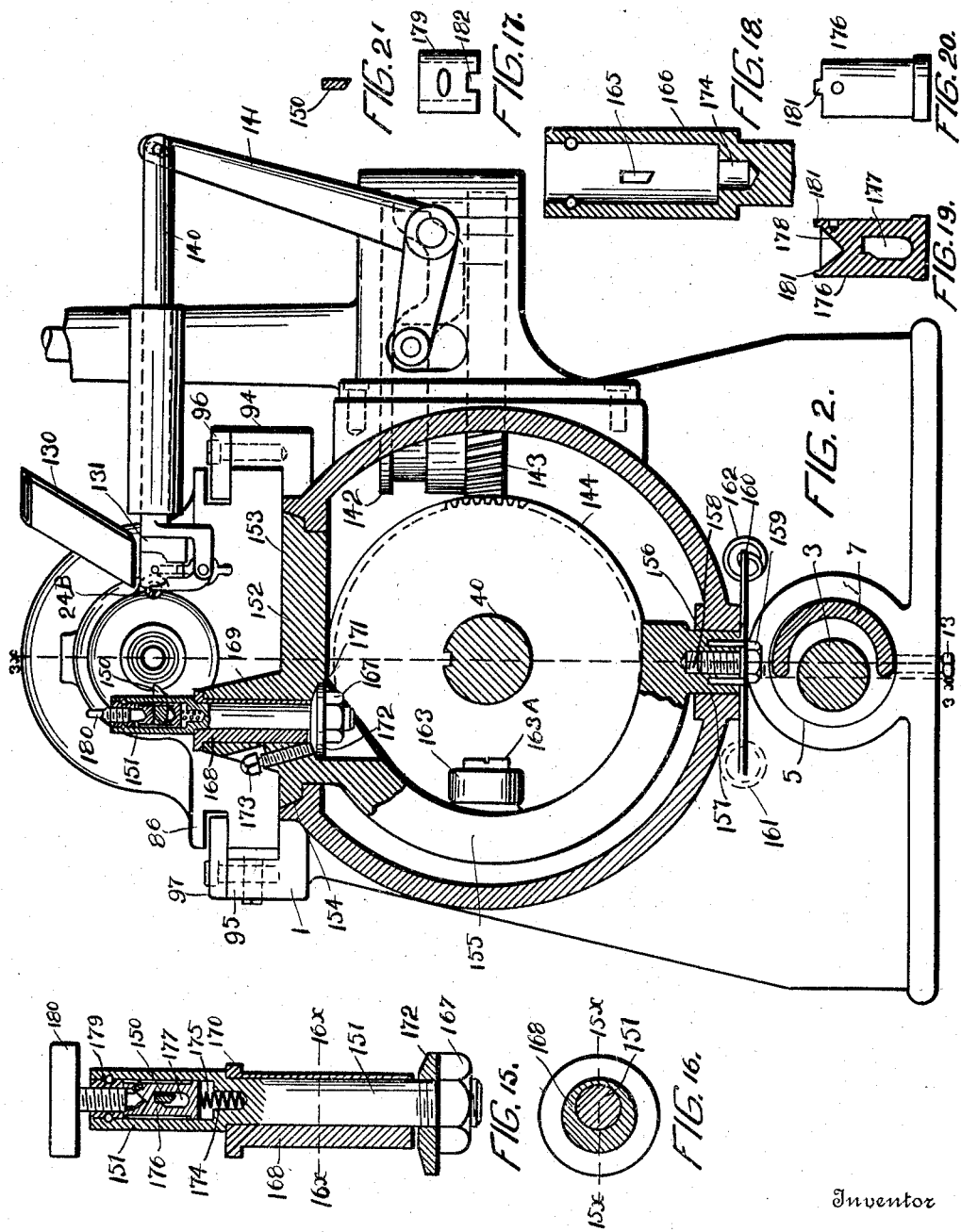

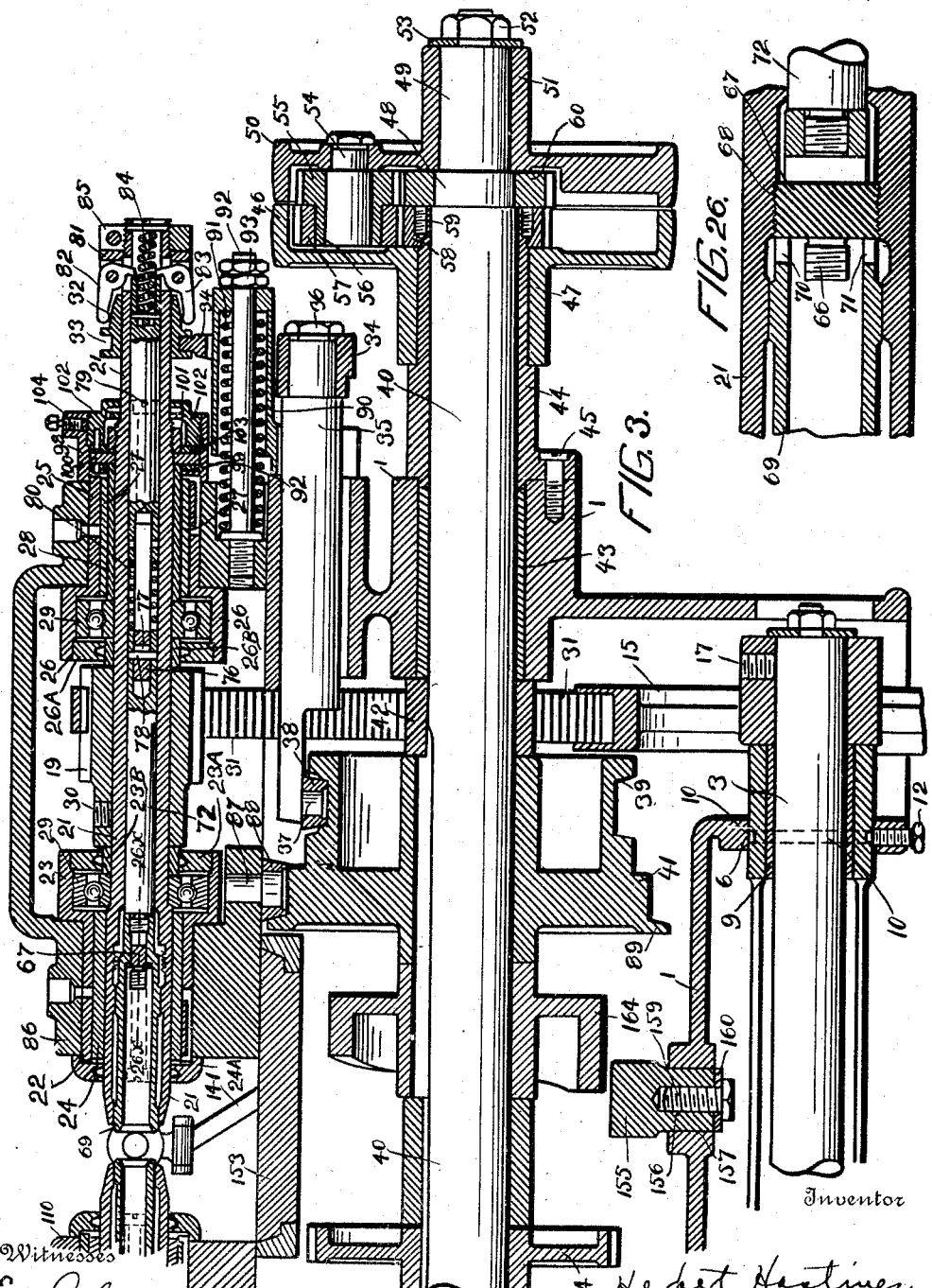

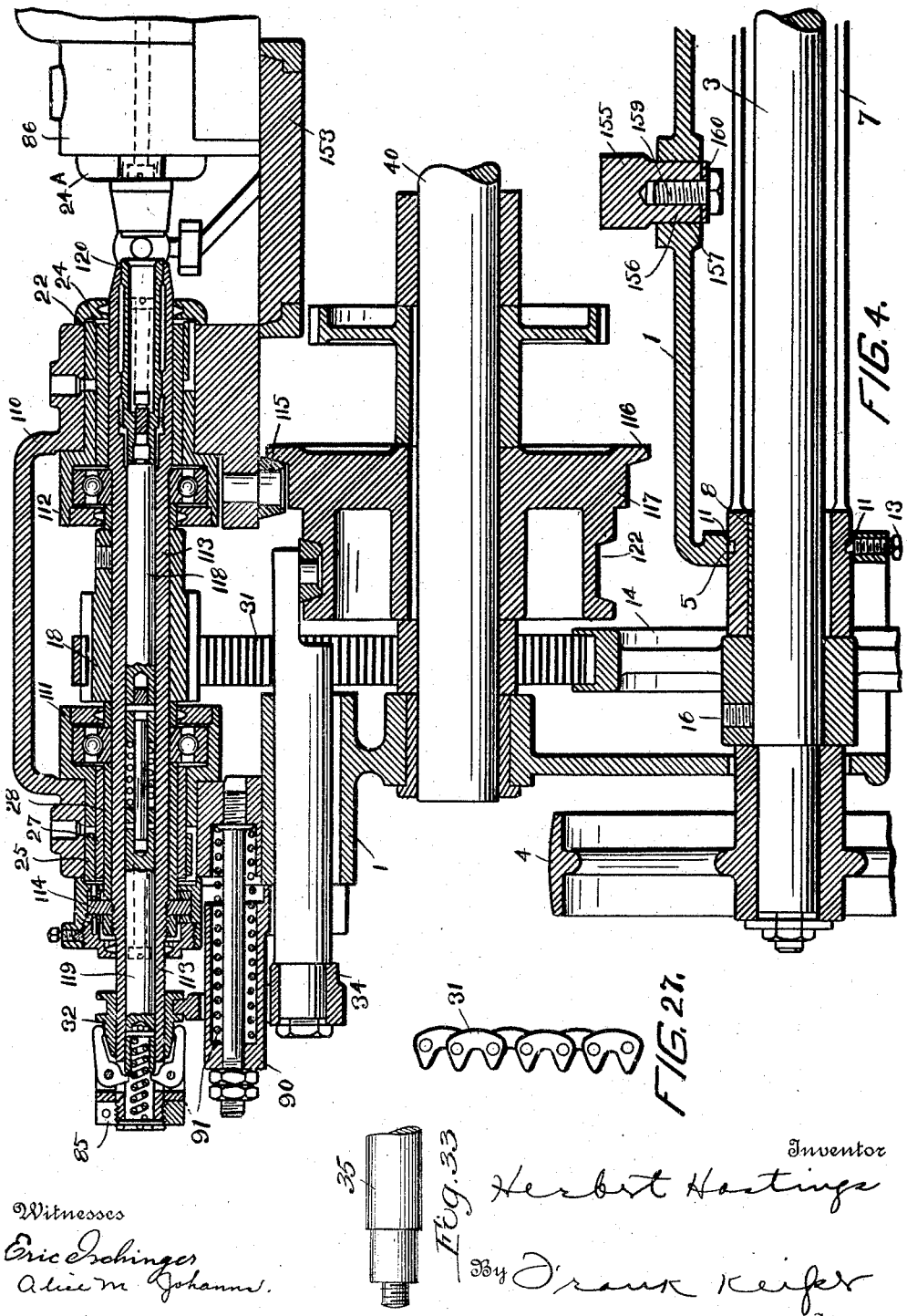

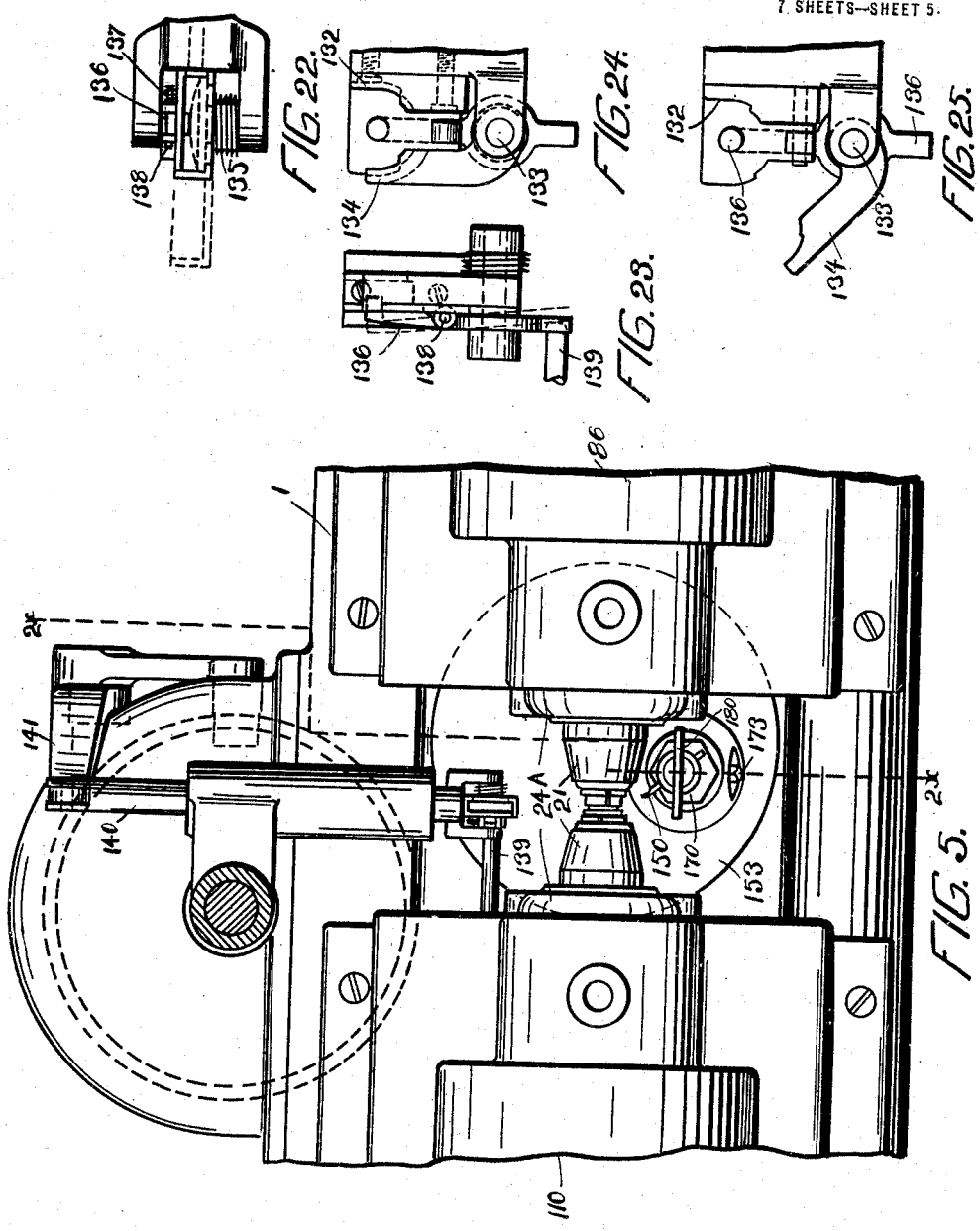

H. HASTINGS.
TURNING MACHINE.
APPLICATION FILED JULY 3, 1913.
1,303,199. Patented May 6, 1919.
7 SHEETS—SHEET 7.
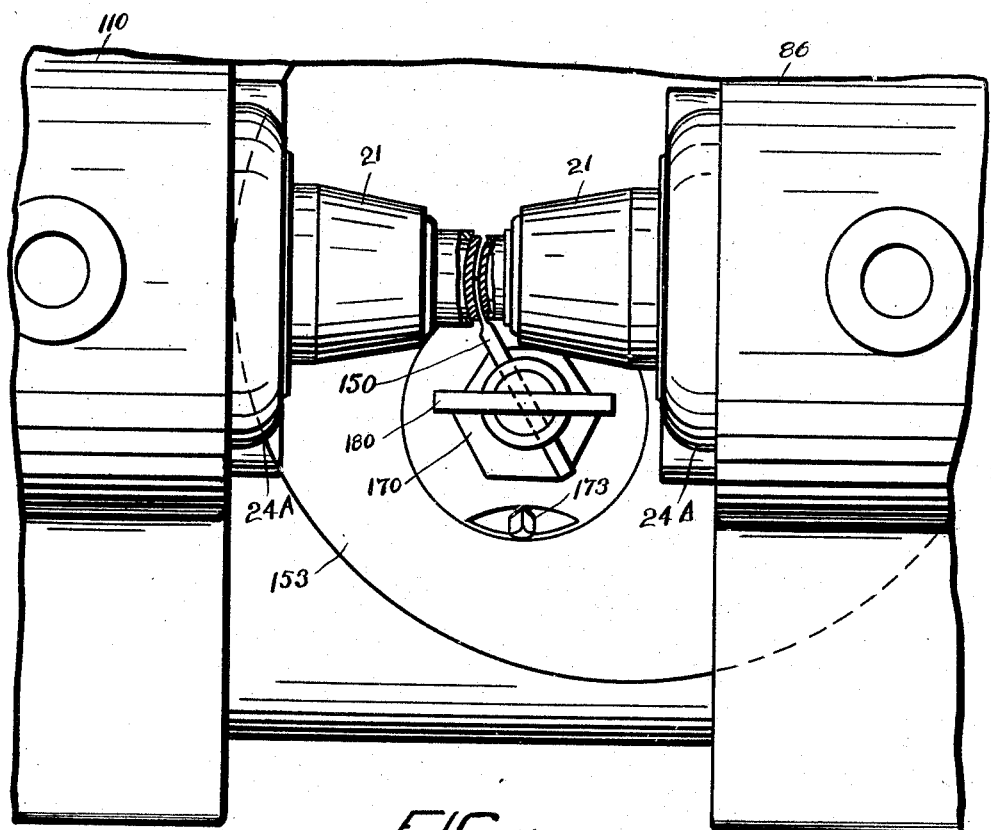
FIG. 11.
 
FIG. 12.  FIG. 13.  FIG. 14.
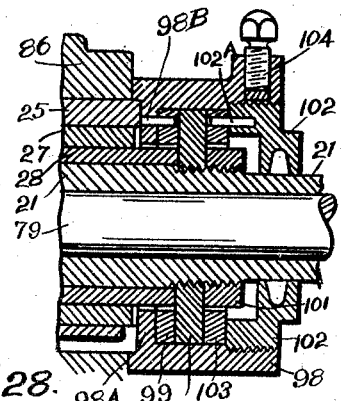
FIG. 28.
   
FIG. 29.  FIG. 30.  FIG. 31.  FIG. 32.
Witnesses
Eric Ischinger
Alice M. Johanne
Inventor
Herbert Hastings
By Frank Keifer
Attorney

UNITED STATES PATENT OFFICE.

HERBERT HASTINGS, OF ROCHESTER, NEW YORK, ASSIGNOR TO ART IN BUTTONS, INCORPORATED, OF ROCHESTER, NEW YORK, A CORPORATION OF NEW YORK.

TURNING-MACHINE.

1,303,199.     Specification of Letters Patent.     Patented May 6, 1919.

Application filed July 3, 1913. Serial No. 777,194.

*To all whom it may concern:*

Be it known that I, HERBERT HASTINGS, a citizen of the United States, residing at Rochester, in the county of Monroe and State of New York, have invented certain new and useful Improvements in Turning-Machines, of which the following is a specification.

The object of this invention is to provide a new and improved machine for turning buttons from the raw material.

Another object of this invention is to provide a machine that will finish the opposite sides of two buttons from the same piece of raw material in one and the same operation.

Another object of this invention is to reduce the waste of the raw material in the production of the buttons.

Another object of this invention is to provide an improved form of chuck tool carrier, blank carrier and other mechanical devices for securing the above named results.

These and other objects of the invention will be fully illustrated in the accompanying drawings, described in the specification and pointed out in the claims at the end thereof.

In the accompanying drawings, Figure 1 indicates a side elevation of my improved machine.

Fig. 2 is a sectional elevation on the line $2^x$—$2^x$ of Fig. 5.

Figs. 3 and 4 together illustrate a longitudinal vertical section taken through the entire machine on the line indicated by $3^x$—$3^x$ in Fig. 2.

Fig. 5 is a top plan view of the central portion of the machine, showing the stock or blank carrier.

Fig. 11 is a portion of the top plan view shown in Fig. 5, with the cutting tool shown in cutting position.

Fig. 12 illustrates a sample of the raw material as it comes to this machine.

Figs. 13 and 14 show the finished product of the machine cut from the raw material shown in Fig. 12.

Fig. 15 is a vertical section through the tool post, the section being taken on the line $15^x$—$15^x$ of Fig. 16.

Fig. 16 is a horizontal section through the tool post, the section being taken on the line $16^x$—$16^x$ of Fig. 15.

Figs. 17, 18, 19 and 20 are detail views of portions of the tool post.

Fig. 21 is a vertical cross section through the cutting tool.

Fig. 22 is a top plan view of the stock carrying device.

Fig. 23 is an end view of the stock carrying device.

Fig. 24 is a side view of the stock carrying device.

Fig. 25 is a side view of the stock carrying device showing the device after it has delivered its stock.

Fig. 26 is a horizontal section through a portion of the right hand chuck on the line $26^x$—$26^x$ of Fig. 3.

Fig. 27 is a detail view of the sprocket chain.

Fig. 28 is a detail sectional view of the thrust bearing of the spindle on an enlarged scale.

Figs. 29, 30, 31 and 32 are cross sections of blanks cut by different shaped tools showing the different configurations of surfaces cut by such tools.

Fig. 33 is a detail view of the end of the shaft 35 showing that its end is threaded.

In the accompanying drawings, like reference numerals indicate like parts.

Figure 8:
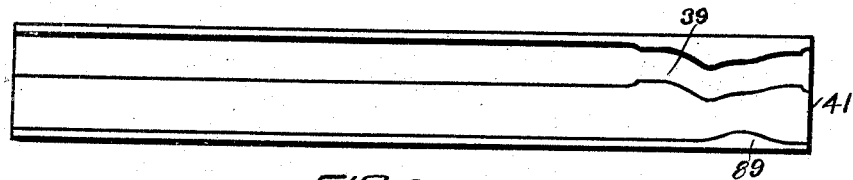
Fig. 8 is a layout of the cam for operating the right hand chuck and head in Fig. 6.

In the drawings, reference numeral 1 indicates the frame or base of the machine, having the legs 2—2 thereunder. On the frame are mounted the following parts: the carriages 86 and 110 which are mounted in line with each other and are adapted to move toward and away from each other, the tool carrier 152 on which the cutting tool is mounted and the stock or blank carrier 131 which receives the blanks, such as are shown in Fig. 12, and carries them to the chucks in the two carriages in which the blank is held and revolved until it is cut into the parts shown in Figs. 13 and 14. It will be understood that the shape of the blank of raw material and the finished product may be varied within wide limits. The machine is also provided with the two power shafts 3 and 40 from which all the parts of the machine are driven. These parts will all be described in detail. The driving shaft 3 is mounted in the base of the machine having a pulley 4 thereon. The shaft 3 is mounted with a vertical adjustment as follows:

In the frame of the machine are provided bearings 5 and 6 in which bearings is mounted a cradle 7 which cradle consists of a tube having eccentric holes in the ends thereof, the intermediate part being partly cut away on its circumference to expose the interior thereof and being of reduced thickness. The cross-section of the intermediate part is shown at the bottom in Fig. 2. Inside of the holes at the ends of the cradle are provided bushings 8 and 9 which bushings are concentric with the shaft 3. On the ends of the cradle are provided the grooves 10 and 11 with which engage the clamping screws 12 and 13 by which it may be clamped in any desired angular adjustment. By rotating the cradle through any desired angle, the shaft 3 may be adjusted vertically to any desired extent within the throw of the eccentric.

Fastened to the shaft 3 are the sprocket wheels 14 and 15, these sprocket wheels being fastened to the shaft by the set screws 16 and 17. These sprocket wheels 14 and 15 are used for the purpose of driving the chucks in a manner that will presently be described.

Figure 6:
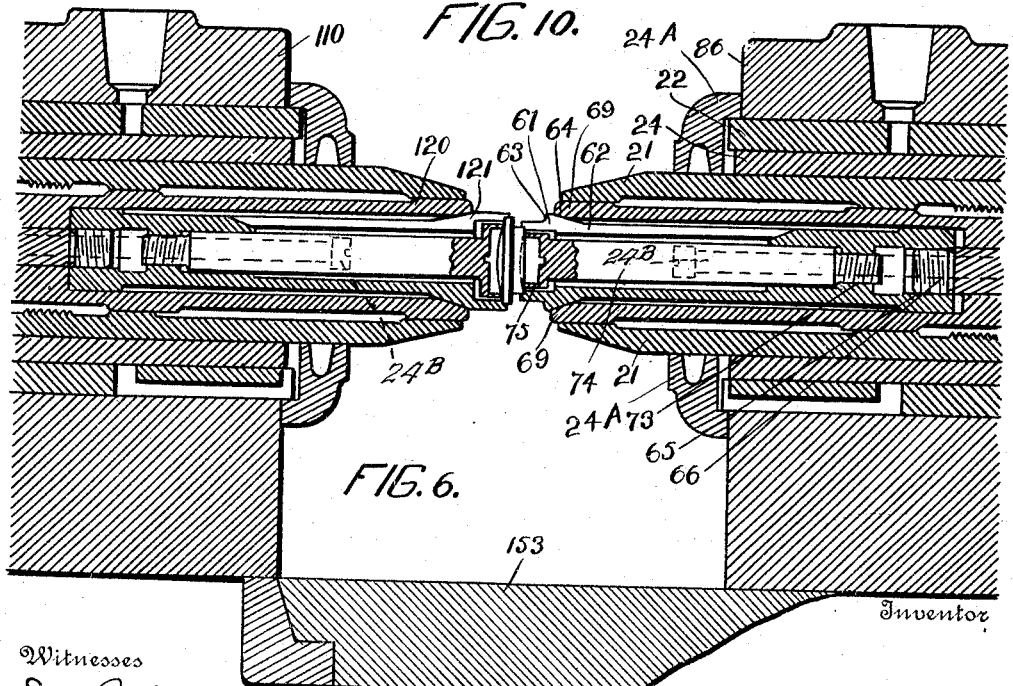
Fig. 6 is a vertical section through the chucks, the chucks and coöperating part being shown in the position which they take when the stock is engaged thereby.

The carriage 86 and the chuck 61 at the right hand of the machine, as illustrated in Fig. 6, will first be described. Mounted in the frame of the carriage 86 is the sleeve 22 having the enlarged end 23. Inside of this sleeve is a floating bushing 24. A collar 24$^A$ is fastened to the frame 86 surrounding the spindle 21 and inclosing the sleeve 22 and bushing 24, holding the lubricating oil in contact therewith. This collar is preferably fastened by screws 24$^B$ that pass through lugs on the collars and through the frame of the carriage 86, making threaded engagement with the enlarged end 23 of the bearing 22. A similar sleeve 25 is shown at the opposite end in Fig. 3, having an enlarged end 26. Within the sleeve 25 is the floating bushing 27. Inside of the bushing 27 is the bushing 28. Inside of the enlarged end 26 is the non-adjustable ball bearing 29, the outer end of which ball-bearing is stationary with the enlarged end 26 and the inner ring of the ball-bearing revolves with the spindle 21. Mounted on the spindle 21 is the sprocket wheel 19 having elongated teeth. This sprocket wheel is fastened to the spindle by the set screw 30. This sprocket wheel is driven from the sprocket 15 by means of the sprocket chain 31, which sprocket chain is shown in side elevation in Fig. 27. The links of the sprocket chain are shaped so that the teeth of the driven pinion 19 can maintain sliding engagement therewith, this being essential to the operation of the machine as the spindle has a reciprocating as well as a rotary motion as will presently appear. All the foregoing parts are shown in Figs. 3 and 4 except that the chucks 61 and 121 are omitted from both figures.

Mounted on the spindle 21 is the thimble 32 having a groove 33 therein. This groove is engaged by the reciprocating arm 34 carried on the sliding shaft 35. To receive the arm 34, the shaft 35 is provided with the reduced end leaving a shoulder thereon. The end of the shaft 35 is still further reduced and is threaded to receive the nut 36. See Fig. 33. The hub of the sliding arm 34 engages with the first reduced end of the shaft 35. The nut 36 engages with the threaded end of the shaft 35 and forces the hub against the shoulder on the shaft between which shoulder and the nut the hub is pinched. At the opposite end of the shaft 35 the shaft is cut away as is shown in Fig. 3 and carries on the under side, a stud 37, having an anti-friction roller 38 thereon. This anti-friction roller is engaged by the cam 39 by which it is positively driven back and forth upon the rotation of the shaft 40 to which the cam 39 is keyed.

The layout of the cam 39 is illustrated in the upper part of Fig. 8.

The shaft 40 rotates with a comparatively slow angular movement which movement is secured as follows: Placed next to the cam wheel 41 is the sleeve 42. Between the frame 1 of the machine and the shaft 40, is placed the bearing sleeve 43. Next to the sleeve 43 is placed the feed pulley bracket 44, which is fastened to the frame of the machine by the screws 45. Mounted to rotate on the sleeve 44 is the idle pulley 46, for which purpose it is provided with a hub 47. The shaft 40 is provided with a reduced end having the steps 48 and 49 thereon. On the step 49 is placed a pulley 50 which pulley has the hub 51 thereon. The end of the shaft is again reduced and threaded. The washer 53 is placed thereon against the hub 51 and the parts are fastened in place by the nut 52 which engages with the threaded end of the shaft.

Mounted in the pulley 50 is the stud 54 on which is mounted to rotate the pinion 55. This pinion has integral therewith a sleeve 56 on which is mounted the pinion 57. The pinion 57 has more teeth therein than the pinion 55 and these pinions are keyed together so that they rotate as one. Mounted on the bracket 44 is the pinion 58 to which it is keyed by the studs 59. This pinion is rigid and does not turn but the pinions 55 and 57 turn as the pulley 50 revolves and carries the pinions around in a sun and planet movement. Keyed to the shaft 40 is the pinion 60 which pinion meshes with the pinion 55 and as the system rotates in the manner above described, the shaft 40 will be driven at a low angular velocity. The preferred reduction is in a ratio of about 12 to 1. It will be understood of course, that the belt can be shifted from the driving pulley 50 to the idle pulley 46 on which it will turn idly.

In Fig. 6 I have illustrated the chuck 61 by which the buttons are gripped during the process of turning. This chuck consists of a sleeve which is solid at the base and is slotted with three slots at the head, these slots being spaced 120° between centers. One of the slots 62 appears in Fig. 6. These slots are all of the same length, the outer end is finished with a shoulder 63 and a cam 64. The base of the chuck is threaded internally as indicated at 65 which thread is adapted to engage with the male thread 66, (see Figs. 6 and 26) on the flat screw 67, which screw has two flat sides or edges, which are threaded and engage with the female thread 68 within the spindle 21. By means of the flat screw, the chuck may be fastened rigidly in the spindle with the chuck closing sleeve 69 interposed between them and movable along the axis independently thereof to a limited extent. The chuck closing sleeve 69 is slotted with slots 70 and 71 through which the sides of the flat screw 67 extend into engagement with the spindle. The rear end of the chuck closing sleeve is provided with a female thread which engages with the threaded reduced end of the push rod 72. Inside of the chuck 61 is provided the female thread 73 with which engages the threaded end of the limiting screw 74, the forward end 75 of which is cup shaped so as to contact near the outer diameter of the button to be cut from the stock. This screw limits the depth to which the button can enter the chuck and together with the cutting tool which will be hereafter described, determines the thickness of the button which will be cut.

The push rod 72 is bored out at the right hand end as is shown in Fig. 3 and receives therein the pin 76. This pin is slotted at 77 and is fastened to the push rod 72 by means of the pin 78 with which it maintains a loose engagement. A push rod 79 is provided in line therewith which receives the right hand of the pin 76 to which it is rigidly fastened. Between the adjacent ends of the push rods 72 and 79 is provided a compression spring 80 which holds the push rods apart, their normal position with relation to the spindle 21 being as shown in Fig. 3. The normal position of the push rod is secured as follows:

The collar 81 is slidably mounted near the right hand end of the spindle 21. On this collar are provided the bell cranks 82 and 83, the long arms of which rest upon the thimble 32. This thimble shown in its operating position in Fig. 3 is operated by the cam 39 and the associated parts heretofore described. This thimble is at regular intervals moved to the left permitting the long arms of the bell cranks 82 and 83 to swing inward toward the spindle and permitting the push rod 79 to move to the right, in which direction it is pulled by the tension spring 84 which is fastened to the push rod 79 at one end and to the spindle 21 at the other end. The collar 81 is held in place on the spindle by means of the nut 85 which engages with the threaded end of the spindle. The spindle is also suitably slotted to receive the short arms of the bell cranks 82 and 83.

The spindle, chuck and other parts associated therewith are mounted in the frame or carriage 86, that is adapted to slide on the frame 1 of the machine. This sliding movement is secured and regulated by mechanism that will now be described. On the frame 86 is provided the stud 87 with the anti-friction roller 88 mounted to rotate thereon. On the cam wheel 41 is provided the flange 89 which has a cam thereon the layout of which is shown in the lower part of Fig. 8. By the rotation of the cam wheel 41, the carriage 86 is driven to the right from the position shown in Fig. 3. The carriage is moved to the left by the following mechanism:

Attached to the frame 1 is the housing 90 which housing is adapted to receive the spring 91. Fastened to the frame 86 of the carriage is the stud 92 which stud passes through the spring 91, and through the recessed portion of the housing and through a hole in the end of the housing. The outer end of the stud 92 is threaded and is provided with the lock nuts 93. The housing 90 is rigid with the frame of the machine and by means of the nuts 93 sufficient initial compression may be given to the spring 91 to hold the carriage 86 normally in the position shown in Fig. 3. As the cam on the flange 89 operates to move the carriage 86 to the right it will still further compress the spring 91, driving the stud 92 through the housing and after the cam on the flange 89 has passed the roller 88, the spring 91 will expand and drive the carriage 86 to the left until the nuts 93 come into contact with the housing 90.

The mounting of the sliding carriage 86 is shown in end elevation in Fig. 2. The frame 1 has the uprights 94 and 95 thereon, on the top of which is fastened the caps 96 and 97 which caps engage with suitable slots in the sides of the carriage 86. By means of this engagement, the carriage 86 is held securely in place and is permitted a sliding movement.

Adjustment is secured between the spindle 21 and the carriage 86 as follows: The carriage 86 is provided with a housing 98 in which is provided a washer 99 which washer is pinned to the internal flange of the housing by a horizontally extending pin 98$^B$ (see Fig. 28) so as to prevent the rotation of the washer. The spindle 21 is provided with the sleeve 28 heretofore described against which is clamped the washer 100 by means of a nut 101 for which the spindle 21 is suitably threaded. The housing is fitted with a female thread at the outer end to receive a plug 102 on the inner end of which is provided the washer 103 which is pinned thereto by a horizontally extending pin 102$^A$ (see Fig. 28) to prevent the rotation thereof. A set screw 104 is provided to clamp the plug 102 in its set position. It will thus be seen that the washer 100 is clamped to the spindle 21 with which it must rotate and that this washer rotates between the washer 99 and the washer 103, which are securely held against longitudinal movement and which forms a thrust bearing for the spindle in which bearing any wear can be taken up.

The parts referred to are assembled as follows: First the sleeves 22 and 25 are inserted in their respective places in the carriage 86 through the opening in the bottom of the carriage. The caps 24$^A$ and the sleeve 22 may then be fastened in place by screws 24$^B$, which pass through the cap 24$^A$ and through one end of the carriage and thread into the large end 23 of the sleeve 22.

The housing 98 and the sleeve 25 are then fixed in position by the screws 98$^B$, which pass through the housing and the other end of the carriage and thread into the large end 26 of the sleeve 25. The floating bushings 24 and 27 may then be inserted in their respective sleeves.

The bearings 29 are next inserted in their respective sleeves and the oil retainers 23$^A$ and 26$^A$ are fastened in place in the enlarged ends 23 and 26, and the spacing collars 23$^B$ and 26$^B$ are inserted in the oil retainers. The pinion 19 is then inserted between the spacing collars 23$^B$ and 26$^B$ and the small end of the spindle 21 is then entered through the bushing 24, the left hand bearing 29, the spacing collar 23$^B$, the pinion 19, the spacing collar 26$^B$, the right hand bearing 29 to its extreme right hand position as shown. The bushing 28 is then slipped in place through the housing 98, and the washer 99 is assembled against the flange 98$^A$ and in engagement with the pin 98$^B$. The collar 100 is placed in position against the bushing 28 and is clamped in place by the nut 101 which clamps the parts 29, 23$^B$, 19, 26$^B$, 29, 28 and 100 in place on the spindle against the shoulder near the left hand end of the spindle. The washer 103 is then placed on the face of the threaded plug 102 in engagement with the pin 102$^A$. The plug 102 is then screwed into position in the housing 98 carrying the washer 103 with it into contact with the collar 100 and is adjusted to give the proper clearance and is held from turning by the binding screw 104.

It will now be understood that the carriage 86 has a forward and back motion determined by the cam on the flange 89 and the spring 91. It will also be understood that the spindle 21 moves forward and back with the carriage. It will also be understood that the push rod 79 has a forward and back movement independent of the spindle which movement is determined by the cam 39 and the spring 84. The effect of these combined movements is first to cause the carriage 86 to advance with the chuck 61 and spindle 21, which movement is followed by the forward movement of the push rods 79 and 72 which carry therewith the chuck closing sleeve 69. This permits the chuck first to move into position for engagement with the button stock after which the chuck closing sleeve moves forward and causes the chuck to close in on the stock by reason of the engagement of the chuck closing sleeve 64 on the chuck. While the chuck is thus in engagement with the button stock the chuck is rotated by means of the sprocket chain 31 which drives the sprocket pinion 19. After the turning of the button has been completed the cam 39 operates to permit the withdrawal of the chuck closing sleeve 69 after which the spindle 21 and the chuck connected therewith is withdrawn with the carriage 86 upon which the finished button can drop out of the chuck.

Figure 7:
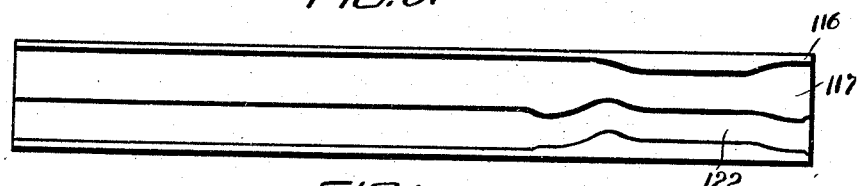
Fig. 7 is a layout of the cam for operating the left hand chuck and head in Fig. 6.

Coöperating with the chuck and carriage heretofore described is a similar carriage 110 which is substantially the same in construction, the operation of which however, is slightly different in the timing. Carriage 110 is provided with the non-adjustable ball-bearings 111 and 112, the inner members of which support the spindle 113 and rotate therewith. The spindle 113 has the washer 114 clamped thereon which forms a thrust bearing therefor, causing the spindle to move forward and back with the carriage 110, but permitting it to rotate freely therein. The carriage is provided with the anti-friction roller 115 which is engaged by a flange 116 on the cam wheel 117 which flange has a cam thereon, the layout of which is shown at the top of Fig. 7. Inside the spindle 113 are the push rods 118 and 119, in the forward end of which is fastened the chuck closing sleeve 120, the spindle 113 carrying a chuck 121 similar to the chuck 61 heretofore described. It will of course, be understood that while the machine is working on stock such as illustrated in Fig. 12, one of the chucks must be capable of receiving a large end of the blank and the other chuck the small end of the blank, and in Fig. 6 the chuck 61 is adapted to receive the small end and the chuck 121 is adapted to receive the large end, the chucks and the openings therein being in every case, proportioned to the size of the stock that they are intended to be worked in connection with. The push rods 118 and 119 are operated through the cam 122 in substantially the same way as has heretofore been described in connection with the push rods 72 and 79 and the cam 39. The layout of the cam 122 is shown at the bottom of Fig. 7 and the cams 122 and 116 are designed so that they will bring the carriage 110 with its chuck forward into position for engagement with the button stock after the carriage 86 and its chuck 51 have moved forward and engaged with the button stock and they will also cause the carriages 110 and 86 to withdraw simultaneously carrying the finished buttons with them and as they reach the end of their backward movement, the cams 39 and 122 operate to permit the withdrawal of the chuck closing sleeves, permitting the chucks to spring open and drop the button thereby. In connection with the carriage 110 I have used the same reference numerals to some extent as have been used in connection with the corresponding parts in carriage 86, believing that a duplication of the description of these parts is unnecessary.

In case the stock illustrated in Fig. 12, is of larger diameter than it should be, it will prevent the chuck from closing in on it to the normal extent leaving it larger in diameter and this in turn will prevent the normal forward movement of the chuck closing sleeve. As the chuck closing sleeve 69 is regulated in its forward movement by the cam 39, operating through the thimbles 32 and the bell cranks 82 and 83 and the chuck closing sleeve 120 is operated by the corresponding parts in Fig. 4, which parts drive the sleeves forward toward each other positively it is obvious that the chuck closing sleeve 69 and the push rods 72 and 79 and the corresponding parts in Fig. 4, will be subjected to an undue strain unless provision is made to take up this strain. For this purpose the compression spring 80 heretofore described has been provided and when the strain exceeds the expansive force of the spring 80, it will operate to compress the spring 80 causing the pin 76 to slide in the push rod 72 to the extent of the slot 77 illustrated in Fig. 3. The clearance between the slots 77 and pins 78 is made sufficiently large so that the pin 76 can never make a direct thrust on the pin 78, and thus any exceptional diameter of the stock can be accommodated without injury to the machine or the stock.

My machine also embodies a mechanism for feeding the button stock successively to the chucks and also embodies a tool by which the stock is cut into buttons and these parts will now be described.

The button stock is first placed in a hopper or reservoir on one side of which is a rotating dial which takes the blanks right side up one at a time out of the reservoir and drops them into a chute. This mechanism is described in my prior Patent No. 1,008,032 and forms no part of my present invention although it is used in connection therewith. A chute through which the buttons are now fed is indicated at 130 in Fig. 2. The buttons pass through the chute as fast as they are placed therein by the hopper and are dropped into the carrier 131. The button blanks are not permitted to accumulate in the chute but pass through the chute as rapidly as the mechanism places them in there, feeding mechanism being adapted to place one blank in the chute just previous to the time that it is needed in the chucks. The blank then passes through the chute into the carrier 131 by which it is conveyed to the chucks. This carrier is shown in top plan view in Fig. 22, the outline of the blank being shown therein in position in dotted lines. This carrier is open at the top. It contains a half round receptacle 132 which is open on the near side in Fig. 24, a slight flange being provided on the near side to hold the button therein. The forward side of the carrier is pivoted at 133 and this forward side 134 can drop down to the position shown in Fig. 25, but is normally held up in the position shown in Fig. 24 by the torsion spring 135.

Figure 9:
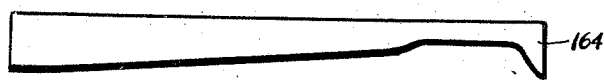
Fig. 9 is a layout of the cam for operating the tool carrier.
Figure 10:
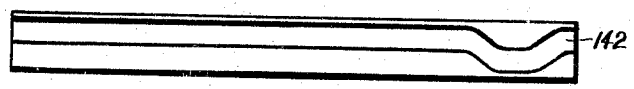
Fig. 10 is a layout of the cam for operating the stock carrier.

After the button blank is dropped into the carrier a presser foot 136 comes forward to properly position the blank in the carrier, that is with the flange on the blank against the flange in the carrier, as is shown in Fig. 22. This presser foot 136 is normally held up in engagement by the torsion spring 137, provided on pin 138 on which the presser foot 136 is pivotally mounted. The lower end of the presser foot 136 is engaged by the rod 139 mounted on the carriage 110. As the carriage 110 comes forward, the rod 139 draws out the presser foot 136 from the carrier by striking against the lower end of it and rocking it around the pin 138. The feeding mechanism then operates to drop the button into the carrier and as soon as the carriage 110 retreats, the presser foot 136 is released and swings forward and forces the blank to the position shown in Fig. 22. The carrier is then advanced to carry the blank to the chucks. For this purpose the carrier is mounted upon the rod 140, which rod is connected to the long arm of the bell crank 141 which bell crank is in turn operated by the rotating cam 142 (shown in Fig. 2), the layout of which cam is shown in Fig. 10. This cam is integral with the spiral gear 143, which meshes with the spiral gear 144, which is keyed to the shaft 40, both of these gears 143 and 144 having teeth which are preferably pitched at an angle of 45° to the normal, the gears being of the same diameter. The cam 142 is timed to advance the carrier to the chuck just before the carriage 86 advances with its chuck open. When the carrier has reached its forward position, the carriage 86 advances with the chuck 61 which chuck takes hold of the button blank and holds it firmly. The carrier then retreats and the carriage 110 advances and takes hold of the blank with its chuck 120. At all times the chucks are rotating at a uniform speed and the blank turns with them. As soon as the chucks have taken hold of the blank, the cutting tool 150 comes into operation. This cutting tool is carried in an upright post 151. This post is mounted on the post carrier 152 which carrier has the circular plate 153 at the top thereof mounted to turn in a suitable bearing 154 in the frame of the machine. Below the plate 152 and integral therewith is provided the curved arm 155, (see Figs. 2, 3 and 4), having a bearing 156 on the bottom thereof adapted to engage with a suitable recess 157 in the frame of the machine in which it is adapted to turn. This bearing 156 is recessed with a female thread 158, which is engaged by stud 159 by which a lever 160 is clamped against the lower end of the bearing 156 holding it in proper position with regard to the frame of the machine. Pins fastened through the lever 160 and into the bearing 156 are also provided to hold the lever 160 in fixed angular position with regard thereto. On the opposite ends of the lever 160 are provided the springs 161 and 162 which springs are attached to the frame of the machine and both of which springs operate to rotate the lever and the post carrier in the same direction. The curved arm 155 is provided with the stud 163ᴬ on which is mounted an anti-friction roller 163 which by the springs 161 and 162 is held against the cam wheel 164, keyed to the shaft 40. The layout of the cam 164 is shown in Fig. 9. The rotation of the cam 164 causes the post carrier to oscillate in its bearing, causing the cutting tool carried in the post to advance into engagement with the blank and cut it into two portions such as are illustrated in Figs. 13 and 14, the cutting tool making a swinging or curved cut, cutting one of the buttons with a convex face and the other with a concave face, the tool being curved to fit the surfaces which it is intended to cut and finish. To secure the proper adjustment of the cutting tool in the post the post, is arranged as follows: The post is hollow at the top as shown in Figs. 15 and 18 and is provided with the recess 165 to accommodate the shank of the cutting tool. The tool post 151 is of reduced diameter at its lower end. It is threaded at its lower end where it can be engaged by the nut 167. The tool post at its reduced diameter is surrounded by the eccentric sleeve 168. This eccentric sleeve fits in the hub 169 provided on the circular plate 152 and it has a hexagonal flange 170 on the upper edge thereof which engages with the top of the hub 169 and by which it is supported. The lower side of the circular plate 153 is provided with a conical recess 171 into which fits a correspondingly conical shaped washer 172. The nut 167 engages the lower end of the post 166 and forces the washer 172 into its seat where it can be clamped both by the nut 167 and the binding screw 173. The eccentricity of the sleeve 168 makes it possible to adjust the post 166 in any desired position within certain limits. As is illustrated in Fig. 18, the post is recessed at 174 to receive the spring 175. On top of this spring rests the binding block 176 which is pierced at 177 to receive the cutting tool. The binding block is also provided with a cone shape recess 178 which is slightly eccentric to the block 176. The top of the tool post is provided with the sleeve 179 which is pinned fast to the post as is shown in Fig. 15 and is provided with the female thread in which works the binding screw 180, which binding screw is provided with a conical tip which engages eccentrically with the conical recess 178 by which the block 176 may be forced downward compressing the spring 175 and carrying the beveled lower side of the cutting tool 150 into engagement with the tapered end of the recess 165 forming a positive bearing for the lower side of cutting tool, the upper end of the recess 177 forming a positive bearing for the upper side of the cutting tool. The upper end of the block 176 is provided with the lugs 181 which engage the recesses 182 in the collar 179 by which angular movement between these two parts is prevented and side movement is permitted. In this way by turning the screw 180, the block 176 can be carried down and sidewise carrying the tool over against the long side of opening 165 and down into the tapered end of the opening 165 thus accurately positioning the two and making special fitting of the top side of the tool in the post unnecessary.

The construction heretofore described holds the cutting tool rigidly with reference to the tool carrier and imparts a swinging movement to the tool causing the point of it to move in a true circular path.

The point of the tool may be of the same width as the blade of the tool or may be narrower or wider if so desired and the cutting edge of the tool may be continued for some distance away from the point and may slope to the right or to the left, causing the tool to cut with varying degrees of curvature on the one side or the other or both sides. The point of the tool alone would cut a true segment of a sphere while the side cutting edge or edges of the tool might cut the surfaces of a paraboloid, a hyperboloid or any other curvature or even a plane surface if so desired. In this manner the blank would be divided into two pieces, one piece having a convex surface with varying degree of curvature or sinuosity, the other piece having a finished surface of any degree of curvature from a concave to a convex surface as may be desired. Either or both may be finished with conical surfaces.

The sleeve 44 carries a bracket 190 thereon on which is pivotally mounted a lever 191 adjacent to the pulleys 46 and 50. (See Fig. 1). The lever 191 has two pins thereon capable of engaging the driving belt by which lever the driving belt may be shifted from one pulley to the other.

The operation of the machine is as follows: Buttons are fed from the hopper through the chute 130 into the carrier 131 which is then advanced by the rotation of the cam 142 until the stock contained therein is in line with the center of the spindles. The carriage 86 advances with its chuck 61 open, it being moved forward by the expansion of the spring 91 as the carriage is released by the rotation of the cam 89. After the chuck has come into engagement with the blank, the cam 39 operates through the sleeve 33 to drive the stems or push rods 79 and 72 forward carrying with it the chuck closing sleeve 69 which pinches the chuck on the stock and causes it to take a firm hold thereon. The stock carrier 131 is then withdrawn and immediately thereafter the carriage 110 advances with the chuck 121 open being pushed forward by the expansion of its spring 171 as the carriage is released by the rotation of the cam 116, and immediately thereafter, the cam 122 operates through the sleeve 32 causing the forward movement of the stems 119 and 118, causing the chuck closing sleeve to close on the chuck 121, thus causing the stock to be gripped from the other side. Immediately thereafter the tool carrier advances with its cutting tool and cuts and forms the stock into two finished pieces. After this cut is completed the carriages are withdrawn from each other positively by the operation of the cams 89 and 116 being forced back thereby and compressing the spring 191 and immediately thereafter the cams 39 and 122 operate to withdraw the thimbles 32, permitting the springs 84 to contract and draw back the stems to which are connected the chuck closing sleeves, thus permitting the chucks to open and the buttons to drop out of the chucks, after which the cycle of operation is repeated.

I claim:—

1. In a turning machine, the combination of a frame, a carriage mounted thereon having a gripping chuck therein adapted to grip the periphery of a button, a second carriage movable toward and away from said first carriage and having a chuck coöperating with the chuck of the first carriage, a tool holder on said frame having a tool with a cutting edge therein, said tool holder being movable to carry the cutting edge of the tool into and out of the space between the chucks of the carriages.

2. In a turning machine, the combination of a frame, two carriages mounted to move variable distances toward and away from each other thereon, a chuck in each of said carriages.

3. In a turning machine, the combination of a frame, two carriages mounted to move toward and away from each other thereon, a chuck in each of said carriages, said chucks being adapted to grip the same piece of stock on the periphery thereof.

4. In a turning machine, the combination of a frame, two carriages mounted to move toward and away from each other thereon, a chuck in each of said carriages, said chucks being adapted to hold between them a piece of stock by gripping the periphery thereof, means for feeding separate pieces of said stock separately to one of said chucks.

5. In a turning machine, the combination of a frame, two carriages mounted to move variable distances toward and away from each other thereon, a chuck in each of said carriages, said chucks being adapted to hold between them a piece of stock by gripping the periphery thereof, means for feeding said stock to one of said chucks, means for withdrawing said feeding means and causing said stock to be gripped by the other chuck.

6. In a turning machine the combination of a frame, a carriage mounted to slide thereon, a rotatable spindle carried therein, a rotating cam engaging with said carriage to move it in one direction, a spring compressed by said movement of the carriage, the expansion of the spring driving the carriage in the opposite direction, a spindle rotatably mounted in said carriage and movable longitudinally therewith, a stem in said spindle rotating therewith and movable longitudinally therein independently thereof.

7. In a turning machine, the combination of a frame, a carriage mounted thereon, a spindle mounted to rotate in said carriage, said carriage having a variable movement parallel to the axis of the spindle, a tool carrier mounted on said frame, a tool mounted in said tool carrier, said tool carrier being adapted to move said tool longitudinally forward and back in a curved path to the axis of the spindle, said tool being adapted to cut transversely through the stock carried by said spindle.

8. In a turning machine the combination of a frame with a tool carrier pivotally mounted therein, a tool post eccentrically mounted in said tool carrier, an eccentric bushing interposed between said post and the tool carrier, said bushing being adjustable between the tool post and carrier, means for clamping the cutting tool in said carrier, said means clamping said eccentric bushing in its adjusted position, positively positioning said tool post and bushing in a predetermined axial position in said tool carrier.

9. In a turning machine, the combination of a frame having spindle carriages mounted thereon having a movement forward to variable stopping point and a movement back to a uniform stopping point, a tool carrier pivotally mounted in said frame, a cutting tool eccentrically mounted in said tool carrier, means for oscillating said tool carrier to cause the tool carried thereby to move in a curved path.

10. In a turning machine, the combination of a frame having spindle carriages mounted thereon having a movement forward to variable stopping point and a movement back to a uniform stopping point, a tool carrier pivotally mounted thereon, a tool post eccentrically mounted in said tool carrier, means for clamping a cutting tool in said tool carrier.

11. In a turning machine, the combination of spindle slides having a movement forward to a variable stopping point, feeding mechanism capable of feeding blanks, gripping mechanisms adapted to grip said blanks on both ends thereof at their peripheries and rotate the blank between them, a cutting device adapted to cut said blank between the gripping mechanisms.

12. In a turning machine, the combination of spindle slides having a movement forward to a variable stopping point, gripping and rotating mechanisms, said mechanisms being adapted to grip and rotate a blank, a cutting device adapted to cut the segment of a sphere from said blank dividing it into two portions, one with a finished concave surface and the other with a finished convex surface, means for operating the cutting device.

13. In a turning machine, the combination of gripping and rotating mechanisms having a movement forward to a variable stopping point, said mechanisms being adapted to grip and rotate a blank, a cutting device adapted to cut the blank into two parts, one with a convex or conical surface and the other with either a concave surface, a plane surface or a convex surface, means for operating the cutting device.

In testimony whereof I affix my signature in presence of two witnesses.

HERBERT HASTINGS.

Witnesses:
ALICE M. JOHANNS,
EDNA K. BOOTH.

Copies of this patent may be obtained for five cents each, by addressing the "Commissioner of Patents, Washington, D. C."